(12) United States Patent
Richardson (10) Patent No.: US 8,439,520 B2
(45) Date of Patent: May 14, 2013

(54) COLOR-CONFIGURABLE LIGHTING ASSEMBLY

(75) Inventor: Brian E. Richardson, Los Gatos, CA (US)

(73) Assignee: Rambus Delaware LLC, Brecksville, OH (US)

( * ) Notice: Subject to any disclaimer, the term of this patent is extended or adjusted under 35 U.S.C. 154(b) by 45 days.

(21) Appl. No.: 13/279,091

(22) Filed: Oct. 21, 2011

(65) Prior Publication Data
US 2012/0099307 A1   Apr. 26, 2012

Related U.S. Application Data

(60) Provisional application No. 61/455,551, filed on Oct. 21, 2010.

(51) Int. Cl.
*F21V 9/00* (2006.01)
*B60Q 1/26* (2006.01)

(52) U.S. Cl.
USPC .............................. 362/231; 362/227; 362/230

(58) Field of Classification Search .................. None
See application file for complete search history.

(56) References Cited

U.S. PATENT DOCUMENTS

| 4,299,443 | A  | * | 11/1981 | Minami et al. | 359/559 |
|---|---|---|---|---|---|
| 2002/0036779 | A1 | * | 3/2002 | Kiyoi et al. | 356/606 |
| 2007/0280414 | A1 | * | 12/2007 | Sasayama | 378/45 |

* cited by examiner

*Primary Examiner* — Natalie Walford
(74) *Attorney, Agent, or Firm* — Renner, Otto, Boisselle & Sklar, LLP (57) ABSTRACT

A collimated light source with solid-state light emitters in which the solid-state light emitter is optically coupled to a high refractive index reflector optic, which reduces the cone angle of the light input to the reflector optic. Reducing the cone angle allows the reflective surface of the reflector optic to be reduced in size compared with a conventional reflector in air. The solid-state light emitter is mounted near the light output surface to further reduce the size of the collimated light source. The highly collimated light beams of different colors generated by multiple collimated light sources enable the lighting assembly to use a decussate optical filter having dichroic filter elements to combine the light beams to provide the compact lighting assembly having a configurable output light color.

14 Claims, 12 Drawing Sheets

COLOR-CONFIGURABLE LIGHTING ASSEMBLY

CROSS REFERENCE TO RELATED APPLICATIONS

This nonprovisional application claims the priority benefit of U.S. Provisional Application Ser. No. 61/455,551, filed on Oct. 21, 2010, titled "Internal Collecting Reflector Optics with Combined Outputs," which is hereby incorporated by reference in its entirety.

BACKGROUND

Lighting devices that generate collimated or near-collimated light beams are used to provide lighting for live performances and special events and for illuminating tall structures. Such lighting devices conventionally use a xenon arc lamp as a light source and a large, deep parabolic reflector to define the direction and beam angle of the light beam. Although xenon arc lamps generate high intensities of white light in a small volume, their efficiency is poor and their service life short. A 1000-watt lamp may only produce 35 lumens per watt of electrical energy and have a service life of only a few thousand hours.

Another disadvantage of the xenon arc-based lighting devices is the reduction in performance that occurs as a result of dirt accumulating on the optical surfaces. This accumulated is compounded by the use of forced-air cooling in such lighting devices. A xenon arc-based light source has at least four surfaces where dirt can accumulate and reduce the light output. Only a small amount of dirt on any of these 4 surfaces significantly reduces the output of the lighting device.

The large, deep parabolic reflector used in a conventional collimated lighting device has a low light collection efficiency. A substantial fraction of the light generated by the xenon arc lamp exits the lighting device through the open end of the parabolic reflector and does not contribute to the collimated beam formed by the light incident on the reflector.

Light emitting diodes (LEDs) have also been used as the light source in lighting devices that output collimated or near-collimated light beam, but challenges remain in efficiently directing the substantially omnidirectional light generated by an LED into a collimated light beam.

DETAILED DESCRIPTION

Figure 1:
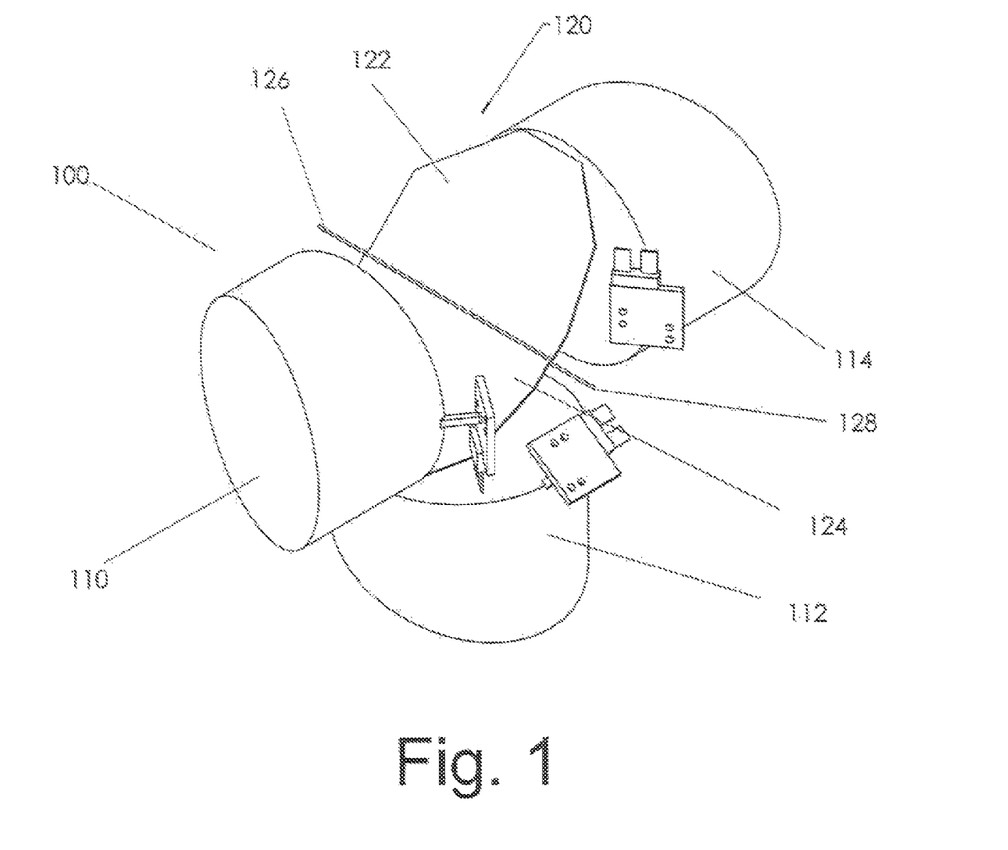
FIG. 1 is an isometric view showing an example of a color-configurable lighting assembly.
Figure 2:
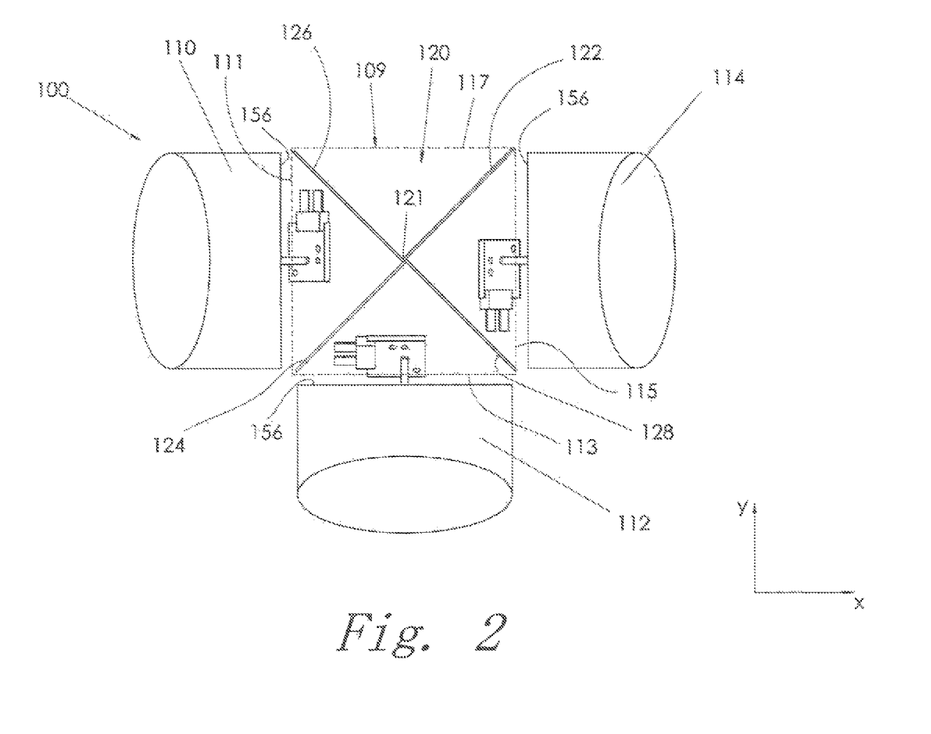
FIG. 2 is a side view showing the color-configurable lighting assembly of FIG. 1.

FIGS. 1 and 2 show an example of a color-configurable lighting assembly 100. Color-configurable lighting assembly 100 includes a collimated light source 110, a collimated light source 112, a collimated light source 114, and a decussate optical filter 120. Collimated light sources 110, 112, 114 are described in greater detail below with reference to FIGS. 3-5. Each of the collimated light sources 110, 112, 114 has a light output surface 156 from which the collimated light source outputs light. Collimated light source 110 outputs light of a first wavelength, collimated light source 112 outputs light of a second wavelength, and collimated light source 114 outputs light of a third wavelength. A suitable armature (not shown) locates collimated light sources 110, 112, 114 with their respective light output surfaces 156 disposed parallel to a first side, a second side and a third side, respectively, of an imaginary square 109.

Decussate optical filter 120 is located in square 109 to direct the collimated light beams output by collimated light sources 110, 112, 114 into a collimated output light beam that exits color-configurable lighting assembly 100 through a fourth side of the square. Decussate optical filter 120 includes two coplanar first reflective filters 122, 124 disposed along a first diagonal of square 120 and facing the first side 111 (adjacent collimated light source 110) and the fourth side 117 (opposite collimated light source 112) of square 109. Each of the first reflective filters 122, 124 has a simple high-pass or low-pass filter characteristic that is reflective at the wavelength of the light output by collimated light source 110 (the first wavelength) and is transmissive at the respective wavelengths of the light output by collimated light source 112 and collimated light source 114 (the second and third wavelengths). Decussate optical filter 120 additionally includes two coplanar reflective filters 126, 128 disposed along a second diagonal of square 109 and facing the third side 115 (adjacent collimated light source 114) and the fourth side 117 (opposite collimated light source 112) of square 109. Each of the reflective filters 126, 128 has a low-pass or high-pass filter characteristic that is reflective at the wavelength of the light output by collimated light source 114 (the third wavelength) and is transmissive at the respective wavelengths of the light output by collimated light source 110 and collimated light source 112 (the first and second wavelengths).

An armature (not shown) that may be part of the armature (not shown) that mounts collimated light sources 110. 112. 114 mounts the reflective filters 122, 124, 126, 128 of decussate optical filter 120 in an X-shaped configuration in which reflective filters 122, 124, 126, 128 radiate from a location 121 approximately centered in square 109. Each of the reflective filters is oriented at ±45° to the x-direction shown in FIG. 2, and the collimated light beams output by collimated light sources 110, 112, 114 are incident on reflective filters 122, 124, 126, 128 at an angle of incidence of ±45°. Reflective filters 122, 124, 126, 128 are typically embodied as dichroic filters, sometimes referred to as interference filters. The filter characteristics of dichroic filters are strongly dependent on the angle of incidence of light on the filter. The filter characteristics of a dichroic filter at a 45° angle of incidence differ in both transmission and reflection from the filter characteristics of the filter at normal angle of incidence. Moreover, at a 45° angle of incidence, small variations in the angle of incidence significantly change the filter characteristics of a dichroic filter in both transmission and reflection. Collimated light sources 110, 112, 114 are mounted relative to decussate optical filter 120 such their output light beams are incident on reflective filters 122, 124, 126, 128 at a nominal angle of incidence of 45°. The highly-collimated output light beams produced by collimated light sources 110, 112, 114 minimize deviations from the nominal angle of incidence. This enables reflective filers 122, 124, 126, 128 to provide such desirable characteristics as well-defined cut-off wavelengths, minimum absorption in transmission and high reflectivity in reflection. Moreover, decussate optical filter 120 is compact and allows collimated light sources 110, 112, 114 to be mounted in close proximity thereto, which contributes to the compact size of color-configurable lighting assembly 100.

In an example, collimated light source 110 outputs a collimated beam of red light, collimated light source 112 outputs a collimated beam of green light and collimated light source 114 outputs a collimated beam of blue light. In this example, reflective filters 122, 124 reflect red light and transmit green light and blue light, and reflective filters 126, 128 reflect blue light and transmit red light and green light. In other examples the colors of the light output by collimated light sources 110, 112, 114 differs from those just exemplified and the filter characteristics of reflective filters 122, 124, 126, 128 are modified accordingly so that reflective filters 122, 124 reflect the light output by collimated light source 110 and transmit the light output by collimated light sources 112, 114 and reflective filters 126, 128 reflect the light output by collimated light source 114 and transmit the light output by collimated light sources 110, 112. The design and fabrication of reflective filters 122, 124, 126, 128 is simplified by arranging collimated light sources 110, 112, 114 in a manner that allows the filters to have a high-pass or low-pass filter characteristic, rather than a band-pass or band-stop filter characteristic. Reflective filters with a high-pass or low-pass filter characteristic are simpler to design and make.

Reflective filters 122, 124 have a low-pass filter characteristic and reflective filters 126, 128 have a high-pass filter characteristic in an example in which the light output by collimated light source 110 is longer in wavelength than the light output by collimated light source 112 and the light output by collimated light source 112 is longer in wavelength than the light output by collimated light source 114. Reflective filters 122, 124 have a high-pass filter characteristic and reflective filters 126, 128 have a low-pass filter characteristic in examples in which the light output by collimated light source 110 is shorter in wavelength than the light output by collimated light source 112 and the light output by collimated light source 112 is shorter in wavelength than the light output by collimated light source 114. A "pass" filter characteristic refers to a range of wavelengths transmitted (not reflected) by the reflective filter.

Figure 3:
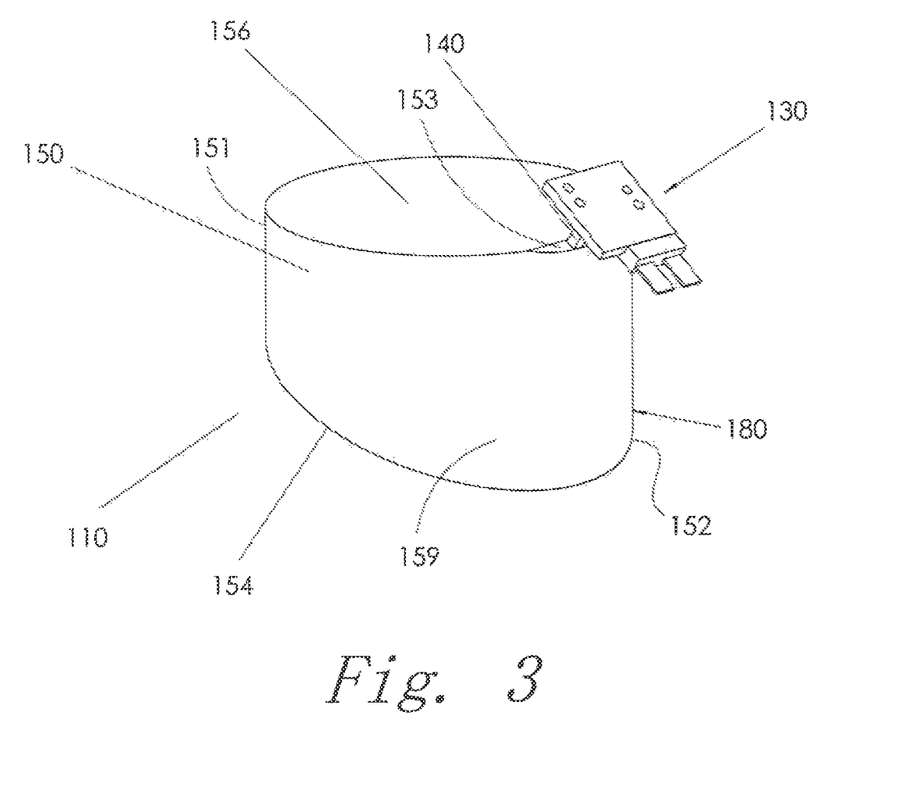
FIG. 3 is an isometric view showing an example of one of the collimated light sources of the color-configurable lighting assembly of FIGS. 1 and 2.
Figure 4:
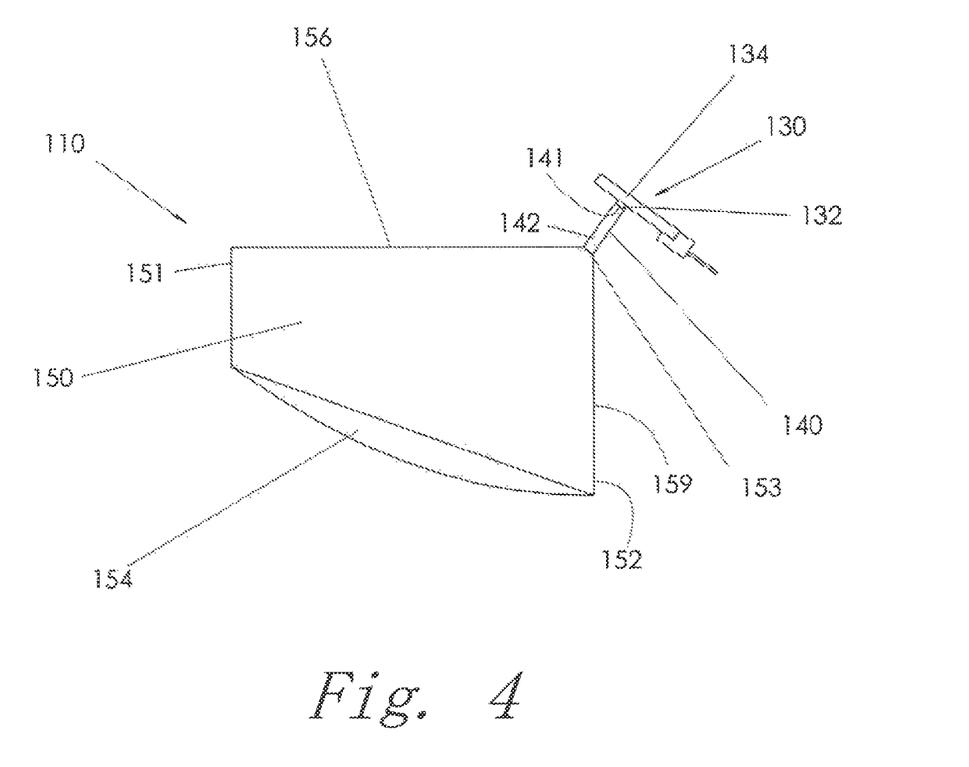
FIG. 4 is a side view showing the collimated light source of FIG. 3.
Figure 5:
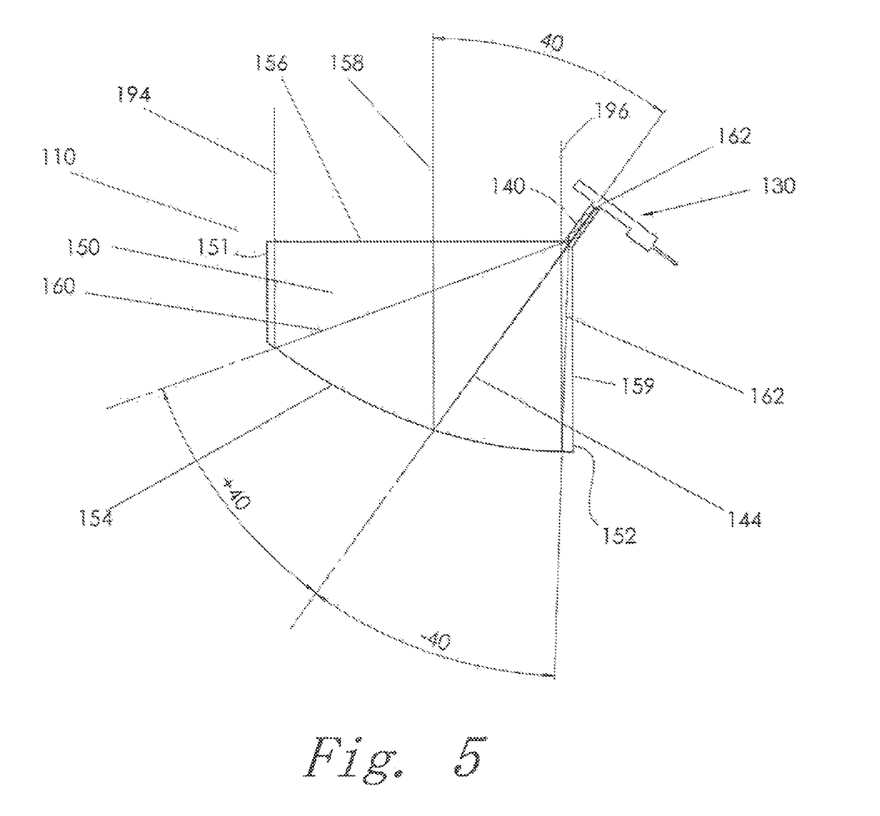
FIG. 5 is a side view showing exemplary ray paths in the example of the collimated light source of FIGS. 3 and 4.

An example of the collimated light source 110 of color-configurable lighting assembly 100 will now be described with reference to FIGS. 3, 4 and 5. Collimated light sources 112, 114 are similar in structure and operation to collimated light source 110 and will not be individually described. Collimated light source 110 has a solid, transparent reflector optic 150 and a solid-state light emitter 130. Reflector optic 150 has a light output surface 156 at its proximal end 151, an off-axis converging reflective surface 154 at its distal end 152, and a light input facet 153 at the edge of light output surface 156.

Solid-state light emitter 130 is mounted in optical contact with light input facet 153 at the edge of light output surface 156. In collimated light source 110, solid-state light emitter 130 generates light of the first wavelength. In each of collimated light sources 110, 112, the respective solid-state light emitter corresponding to solid-state light emitter 130 generates light of the second wavelength and the third wavelength, respectively.

In the example shown, solid-state light emitter 130 includes a light-emitting diode (LED) die 130 in mechanical and thermal contact with a heat sink 134. Since, in the example shown, heat sink 134 is sufficiently large that it would obstruct part of the collimated output light beam output through light output surface 156 if LED die 132 were directly mounted in optical contact with light input facet 153, collimated light source 110 additionally includes an elongate light guide 140 that extends between solid-state light emitter 130 and the light input facet 153 of reflector optic 150. Light guide 140 has a light input surface at its proximal end 141 and a light output surface 142 at its distal end. The light output surface of light guide 140 is affixed to light input facet 153 using, for example, a suitable index-matched optical adhesive. The LED die 132 of solid-state light emitter 130 is affixed to the light input surface of light guide 140 using, for example, a suitable optical adhesive having a refractive index intermediate those of the LED die and the light guide. Light guide 140 indirectly mounts LED die 132 in optical contact with light input facet 153 in a manner that removes heat sink 134 from the path of the collimated output light beam output through light output surface 156. The type and size of solid-state light emitter 130 depends on the application in which color-configurable lighting assembly 100 is used. In some applications, heat sink 134 is substantially smaller than the example shown, and LED 132 can be mounted in direct optical contact with light input facet 153 with negligible obstruction of the collimated output light beam output through light output surface 156. Mounting LED die 132 directly or indirectly in optical contact with light input facet 153 reduces reflection losses that occur as the light generated in the LED die 132 as it exits the LED die and enters light input facet 153 or light guide 140. Moreover, optically coupling the distal end 142 of light guide 140 to light input facet 153 reduces reflection losses that can occur as the light passes from the light guide to reflector optic 150. Optically coupling the distal end 142 of light guide 140 to light input facet 153 also reduces the angular spread of the light as it enters reflector optic 150 through the light input facet.

Light from solid-state light emitter 130 propagates along light guide 140 along paths at angles ranging from approximately +42 degrees to approximately −42 degrees to the centerline of 144 of light guide 140. For brevity, light that propagates along paths at angles of ±x° to a reference is referred to herein as having a cone angle of x° to the reference. The cone angle of the light within light guide 140 depends on the refractive indices of light guide 140 and the portion of LED die 132 in optical contact with the light guide. Light entering reflector optic 150 from LED die 132 in direct optical contact with light input facet 153 has a similar cone angle relative to the normal to the light input facet.

Reflector optic 150 is a transparent solid body and is typically cylindrical in shape. However, reflector optic 150 can have a shape other than cylindrical. Optimum coupling of light from light guide 140 and reflector optic 150 is obtained when light guide 140 and reflector optic 150 have the same refractive index (RI). However, coupling losses are acceptably small with small differences in refractive index (e.g., <±0.1). In some embodiments, light guide 140 and reflector optic 150 are integral with one another. Examples of typical materials of light guide 140 and reflector optic 150 include glass (RI≈1.4-1.6) and plastic, such as acrylic (RI≈1.49) and polycarbonate (RI≈1.58). All of the exemplified refractive indices are much greater than that of air. The higher the index of refraction of reflector optic 150, the narrower the cone angle, relative to center line 144, of the light as it enters the reflector optic from light guide 140, or directly from LED die 132, and the smaller the reflector optic can be. For polycarbonate the cone angle is 39° (rounded to 40° in FIG. 5).

After entering reflector optic 150, the light continues to propagate along paths within the above-described cone angle relative to light guide centerline 144 or the normal to light input facet 153 in the case of LED die 132 mounted in direct optical contact with the light input facet. After propagating through the reflector optic, the light is incident on internal reflective surface 154 at the distal end 152 of the reflector optic. To produce the collimated output light beam needed for color-configurable lighting assembly 100, reflective surface 154 is parabolic in shape, with the focus of the parabola located at light input facet 153. Alternatively, reflective surface has a near-parabolic shape designed using suitable ray-tracing software. In other applications, reflective surface 154 can have other shapes, such as ellipsoidal and aspheric.

Since the light input to reflector optic 150 is incident on reflective surface 154 at relatively small angles of incidence, the light is not subject to total internal reflection at reflective surface 154. Surface 154 is made reflective by a reflective coating applied to the surface. The reflective coating may be a silver coating, an aluminum coating, or a high performance interference coating. The selection of the appropriate coating depends on the performance requirements of the application in which color-configurable lighting apparatus 100 is to be used, and cost considerations.

Light input facet 153 is a plane facet located at the intersection of the light output surface 156 and the sidewall 159 of reflector optic 150. The light input facet is angled non-parallel to light output surface 156 such that all of the light input through the light input facet, and that propagates through the reflector optic with the cone angle described above, is incident on reflective surface 154. The angle of the light input facet causes the normal to the light input facet at the location at which LED die 132 or light guide 140 is mounted to intersect reflective surface 154 at a location offset towards the light input facet from the center of the reflective surface.

In a conventional design that lacks solid reflector optic 150 of a high refractive index material, the light exiting LED die 132 or light guide 140 has a cone angle of 90°. To reflect light with such a large cone angle would require a reflector substantially larger than the internal reflective surface 154 of reflector optic 150. Such a large reflector would make such conventional collimated light source inconveniently large for use in an application such as color-configurable lighting assembly 100.

In collimated light source 110, light input facet 153 where the light enters reflector optic 150 is located at the edge of light output surface 156 through which light exits the reflector optic. Locating light input facet 153 at the edge of light output surface 156 minimizes the angle between the centerline 158 of output surface 156 and the normal to the light input facet, as represented by light guide centerline 144. The smaller the angle between light guide centerline 144 and output surface centerline 158, the smaller the difference between the respective path lengths of a positive internal ray 160 and a negative internal ray 162. The path lengths of these rays determine the angle of the output light beam by their geometry. For a compact collimated light source, these angles should be as close to one another as possible. The greater the angle between light guide centerline 144 and output surface centerline 158, the larger collimated light source 110 needs to be to produce a defined output beam angle. In the example shown, the internal ray path lengths differ from nominal by approximately ±30%. If the angle between light guide centerline 144 and output surface centerline 158 were significantly greater, e.g., 60°, the differences in the internal ray path lengths would be closer to ±60%. To maintain the same output beam angle, reflective surface 154 (and reflector optic 150) would have to be much larger in size. The higher the refractive index of reflector optic 150, the more compact collimated light source 110 can be. Further, the smaller the angle between light guide centerline 144 and output surface centerline 158, the more compact the collimated light source will be.

In the example shown, the output surface 156 of reflector optic 150 is planar. Since the light beam reflected by reflective surface 154 is highly collimated, the output light beam exiting reflector optic 150 through output surface 156 is minimally refracted at the output surface.

In other applications of collimated light source 110, output surface 156 can be other than planar. Moreover, additional optics can be located downstream of output surface 156.

As noted above, in some embodiments, light guide 140 is omitted and LED die 132 is optically coupled directly to the light input facet 153 of reflector optic 150. In such embodiments, a heat sink embodiment smaller than or configured differently from heat sink 134 is used so that the heat sink does not obstruct the collimated output light beam output through output surface 156. In embodiments that include light guide 140, the length of light guide 140 may be longer or shorter than the example shown, depending on the size of solid-state light emitter 130, including heat sink 134, and the angle of light input facet 153.

Figure 6:
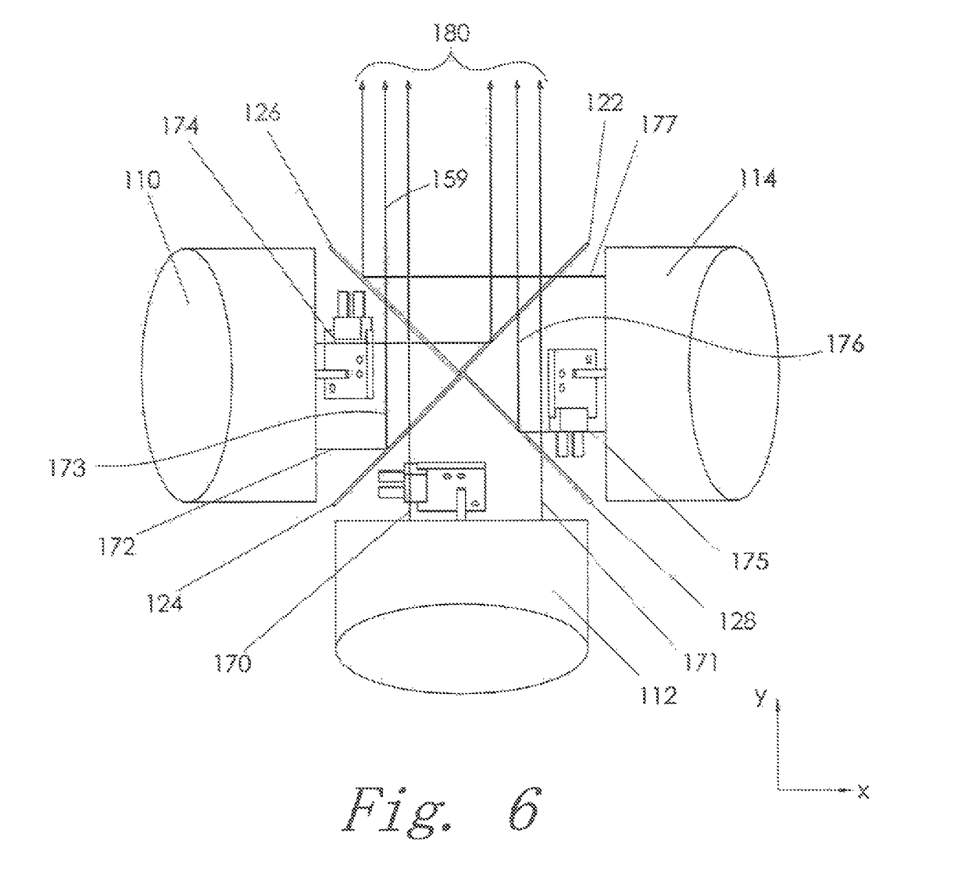
FIG. 6 is a side view showing exemplary ray paths in the example of the color-configurable lighting assembly of FIGS. 1 and 2.
Figure 7:
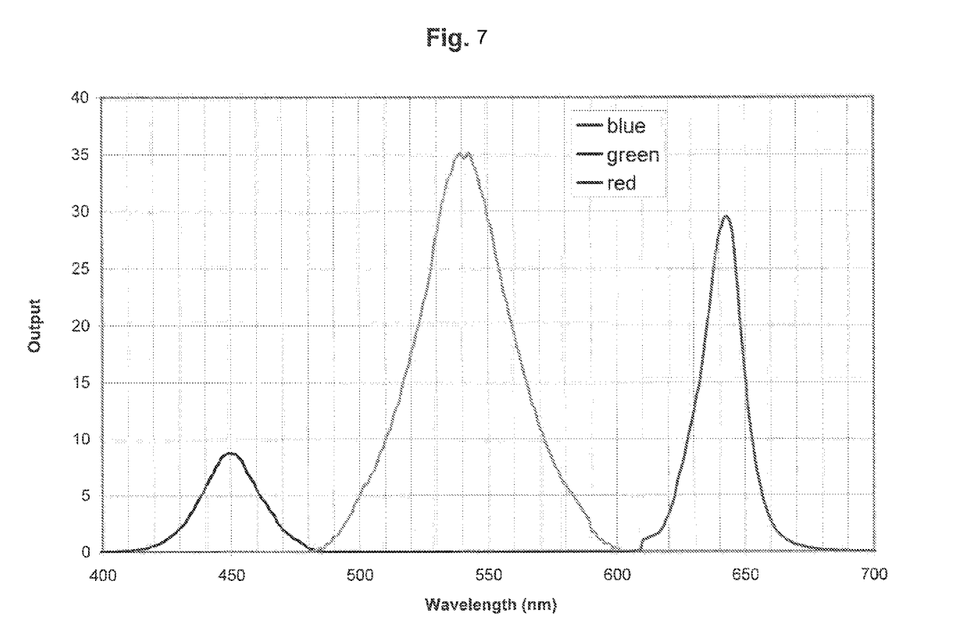
FIG. 7 is a graph showing the variation of intensity with wavelength of blue, green and red light generated by exemplary LEDs.
Figure 8:
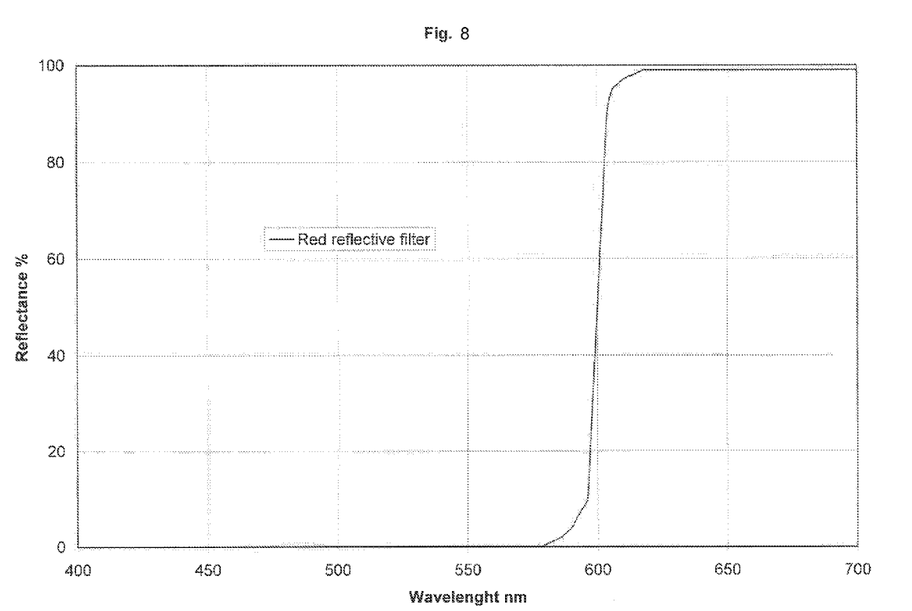
FIG. 8 is a graph showing the variation of reflectivity with wavelength for an example of a reflective filter that reflects red light.
Figure 9:
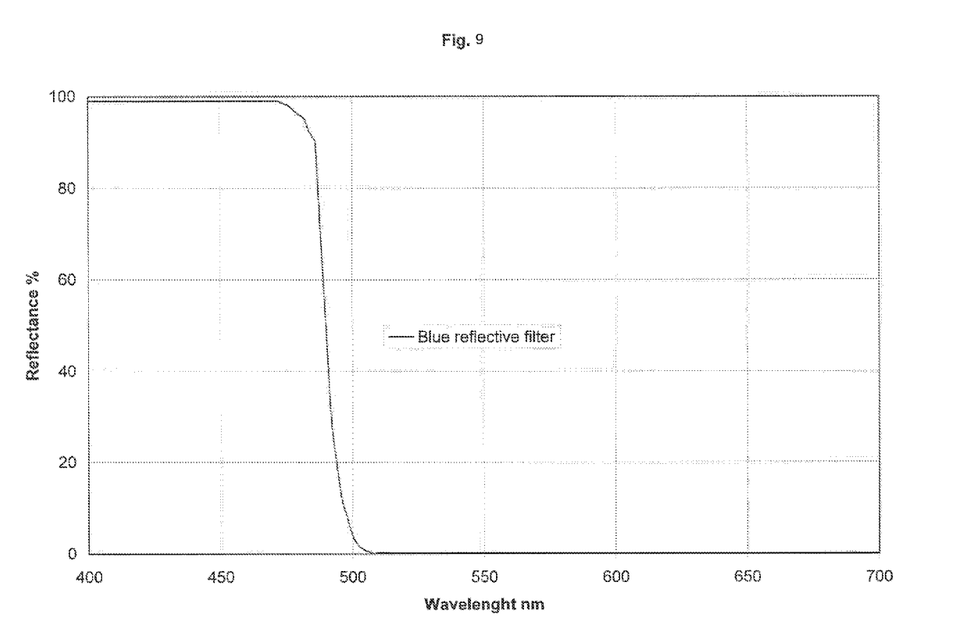
FIG. 9 is a graph showing the variation of reflectivity with wavelength for an example of a reflective filter that reflects blue light.

FIG. 6 shows an example of light ray paths in an example of color-configurable light source 100 in which collimated light source 110 outputs red light, collimated light source 112 outputs green light and collimated light source 114 outputs blue light. In this example, reflective filters 122, 124 reflect red light and transmit green light and blue light, and reflective filters 126, 128 reflect blue light and transmit red light and green light, as described above. FIG. 7 is a graph showing the variation of intensity with wavelength of an example of the red light, green light and blue light collectively output by collimated light sources 110, 112, 114, respectively. FIG. 8 is a graph showing the variation of reflectivity with wavelength of an example of red reflective filters 122, 124 and FIG. 9 is a graph showing the variation of reflectivity with wavelength of an example of blue reflective filters 126, 128.

Collimated light source 112 outputs a ray 170 of green light in the y-direction. Ray 170 from collimated light source 112 passes through red reflective filter 124 and through blue reflective filter 126 with minimal transmission loss. Collimated light source 112 also outputs a ray 171 of green light in the y-direction. Ray 171 from collimated light source 112 passes through blue reflective filter 128 and through red reflective filter 122 with minimal transmission loss. After passing through blue filter 126 and red filter 124, rays 170 and 171 of green light become respective green components of a collimated output light beam 180 of color-configurable light source 100.

Collimated light source 110 outputs a ray 172 of red light that propagates in the x-direction. Red reflective filter 124 reflects ray 172 to produce a red ray 173 that propagates in the y-direction. Red ray 173 passes through blue reflective filter 126 with minimal transmission loss and becomes a red component of collimated output light beam 180. Collimated light source 110 also outputs a ray 174 of red light that propagates in the x-direction. Ray 174 passes through blue reflective filter 126 with minimal transmission loss and is then incident on red reflective filter 122. Red reflective filter 122 reflects ray 174 to produce a red ray that propagates in the y-direction and becomes another red component of the collimated output light beam 180 of color-configurable light source 100.

Collimated light source 114 outputs a ray 175 of blue light that propagates in the −x-direction. Blue reflective filter 128 reflects ray 175 to produce a blue ray 176 that propagates in the y-direction. Blue ray 176 passes through red reflective filter 122 with minimal transmission loss and becomes a blue component of collimated output light beam 180. Collimated light source 110 also outputs a ray 177 of blue light that propagates in the −x-direction. Ray 177 passes through red reflective filter 122 with minimal transmission loss and is then incident on blue reflective filter 126. Blue reflective filter 126 reflects ray 177 to produce a blue ray that propagates in the y-direction and becomes another blue component of the collimated output light beam 180 of color-configurable light source 100.

The collimated output light beam 180 of color-configurable light source 100 is a combination of the red, green and blue light generated by the respective solid-state light emitters of collimated light sources 110, 112, 114, respectively. A controller (not shown) that supplies current to the solid-state light emitters of the collimated light sources can be configured to control the current (or the width of current pulses) supplied to the solid-state light emitters to vary the respective intensities of the different colors of light output by the collimated light sources. For example, energizing the solid-state light emitter of a selected one of the three collimated light sources enables color-configurable lighting assembly 100 to output red light, green light or blue light. Energizing the solid-state light emitters of a selected two of the three collimated light sources causes the color-configurable lighting assembly to output yellow, cyan or magenta light. Changing the respective intensities of the light generated by the solid-state light emitters produces further variations in the color of the light output by the color-configurable lighting assembly. Energizing the solid-state light emitter of the collimated light source that outputs light of a third color reduces the saturation of the color of the light produced by the configurable color lighting assembly. Last, by fully energizing the solid-state light emitters of all of the collimated light sources, color-configurable lighting assembly 100 outputs white light.

Other embodiments of a color-configurable lighting assembly are capable of generating light having a greater color gamut than the example shown. All that is needed is at least one additional collimated light source that outputs collimated light of an additional color, such as yellow or cyan, and a reflective filter that reflects light of such additional color. Additional options for increasing the color gamut include adding infrared and/or ultraviolet light.

Figure 10:
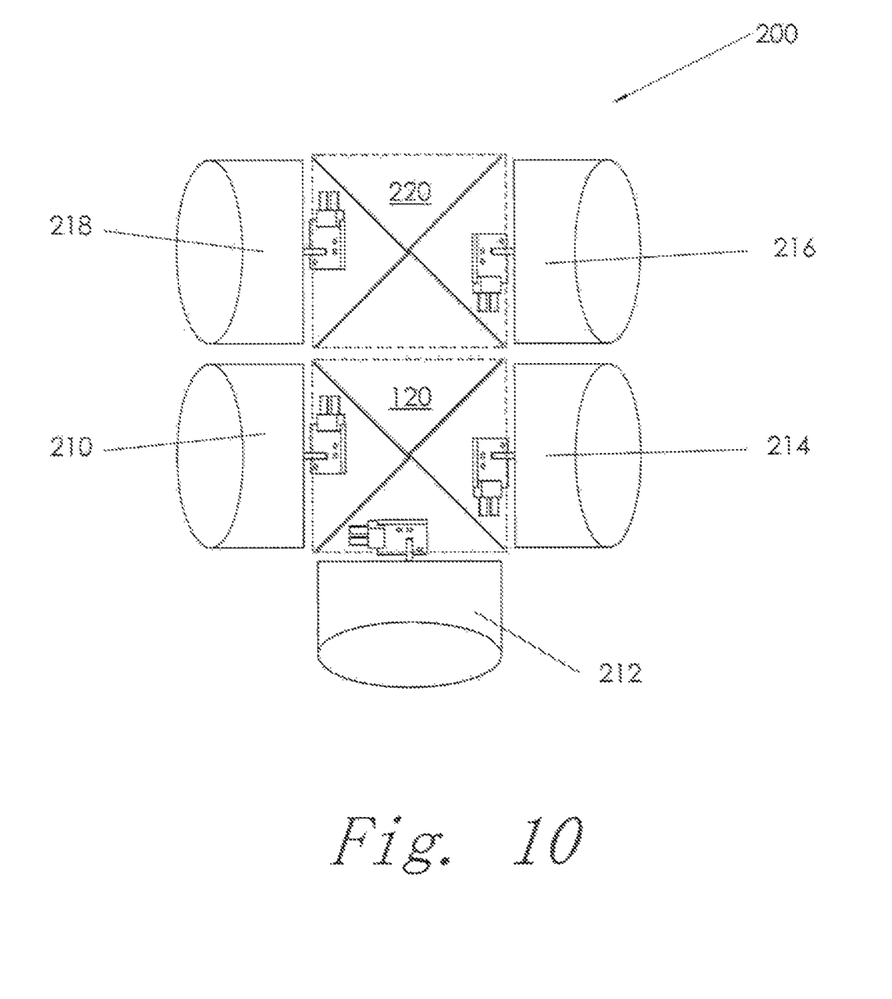
FIG. 10 is a side view showing an example of another embodiment of a color-configurable lighting assembly.

FIG. 10 shows another embodiment 200 of a color-configurable lighting assembly having five collimated light sources 210, 212, 214, 216, 218. Light sources 210, 212, 214 are arranged with their light output surfaces parallel to three sides of imaginary square 109 in a manner similar to that described above. Light sources 216, 218 are arranged with their light output surfaces parallel to opposite sides of an imaginary square 209. Square 209 is arranged in tandem with square 109 with the second side of square 209 juxtaposed with the fourth side of square 109.

Collimated light sources 210, 212, 214 direct collimated light of respective colors towards first decussate optical filter 120 located in square 109 and collimated light sources 216, 218 direct collimated light of respective colors towards a second decussate optical filter 220 located in square 209 and in tandem with decussate optical filter 120. The collimated light beam from first decussate optical filter 120 is also incident on second decussate optical filter 220. The first reflective filters (similar to above-described filters 122, 124) of decussate optical filter 120 reflect the light generated by collimated light source 210 and transmit the light generated by collimated light sources 212, 214. The second reflective filters (similar to above-described filters 126, 128) of decussate optical filter 120 reflect the light generated by collimated light source 214 and transmit the light generated by collimated light sources 210, 212. The first reflective filters (similar to above-described filters 122, 124) of decussate optical filter 220 reflect the light generated by collimated light source 218 and transmit the light generated by collimated light sources 210, 212, 214, and 216. The second reflective filters (similar to above-described filters 126, 126) of decussate optical filter 220 reflect the light generated by collimated light source 216 and transmit the light generated by collimated light sources 210, 212, 214, 218. To simplify the design and manufacture of decussate optical filters 120, 220, the wavelengths of the light output by collimated light sources 210, 212, 214, 216, 218 decrease or increase in the reference numeral order of the collimated light sources. In an example, the light output by collimated light sources 210, 212, 214, 216, 216 is red, yellow, green, cyan and blue, respectively. This allows the reflective filters to be simple low-pass or high-pass filters rather than band-pass filters.

Figure 11:
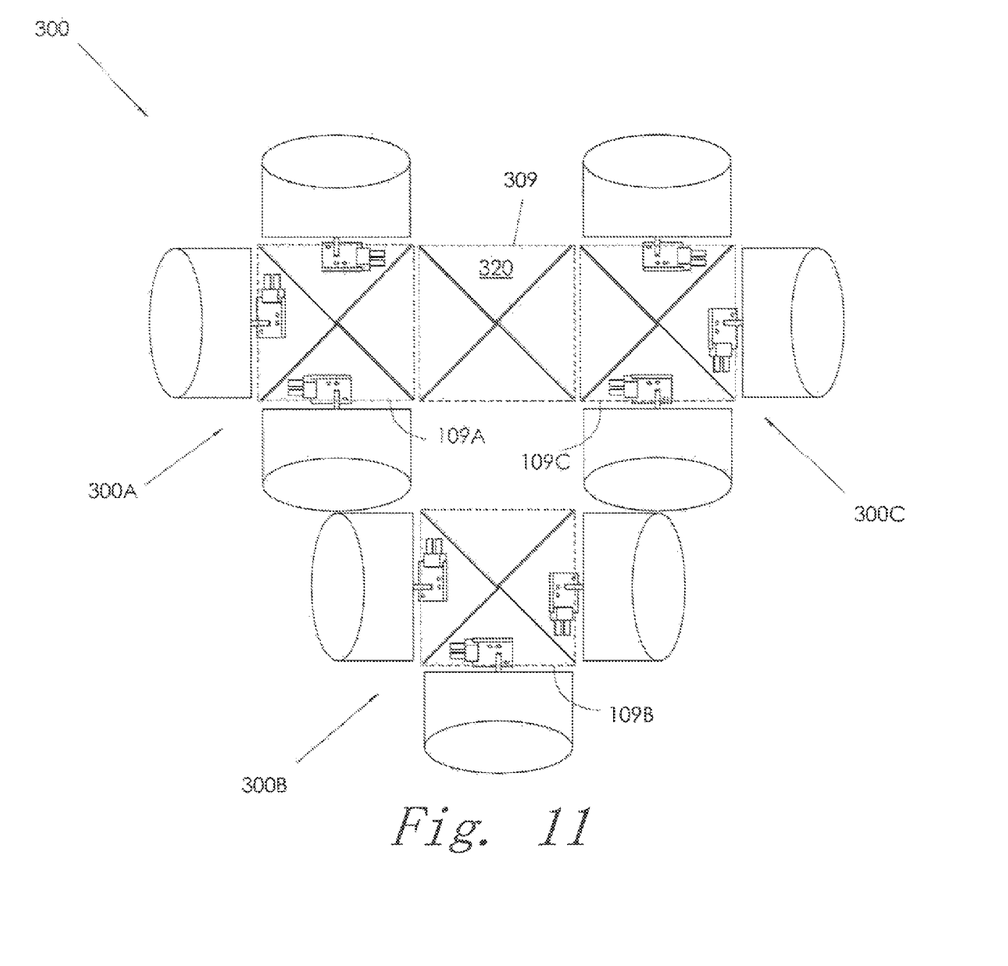
FIG. 11 is a side view showing an example of a color-configurable lighting array.

Color-configurable lighting assemblies similar to color-configurable lighting assembly 100 can be combined to form a color-configurable lighting array that generates a collimated output light beam having an increased color gamut and/or an increased intensity compared with that generated by a single color-configurable lighting assembly. FIG. 11 is a schematic drawing showing an example of a color-configurable lighting array 300 having an increased color gamut due to respective contributions of light from solid-state light emitters that generate nine different colors of light. An additional decussate optical filter 320 is located in a square 309 in a manner similar to that described above. An armature (not shown) mounts color-configurable lighting assemblies 300A, 300B, 300C with the fourth sides (117 in FIG. 2) of their respective squares 109A, 109B, 109C disposed parallel to three sides of an imaginary square 309. Color-configurable lighting assemblies 300A, 300B, 300C direct respective collimated output light beams onto additional decussate optical filter 320 in a manner similar to the above-described way in which collimated light sources 110, 112, 114 direct respective collimated output light beams onto decussate optical filter 120. Color-configurable lighting array 300 outputs a collimated output light beam from the fourth side of square 309. To simplify the design and manufacture of decussate optical filter 320, each of the color-configurable lighting assemblies 300A, 300B, 300C respectively outputs light of three consecutive wavelengths in the set of nine wavelengths.

Figure 12:
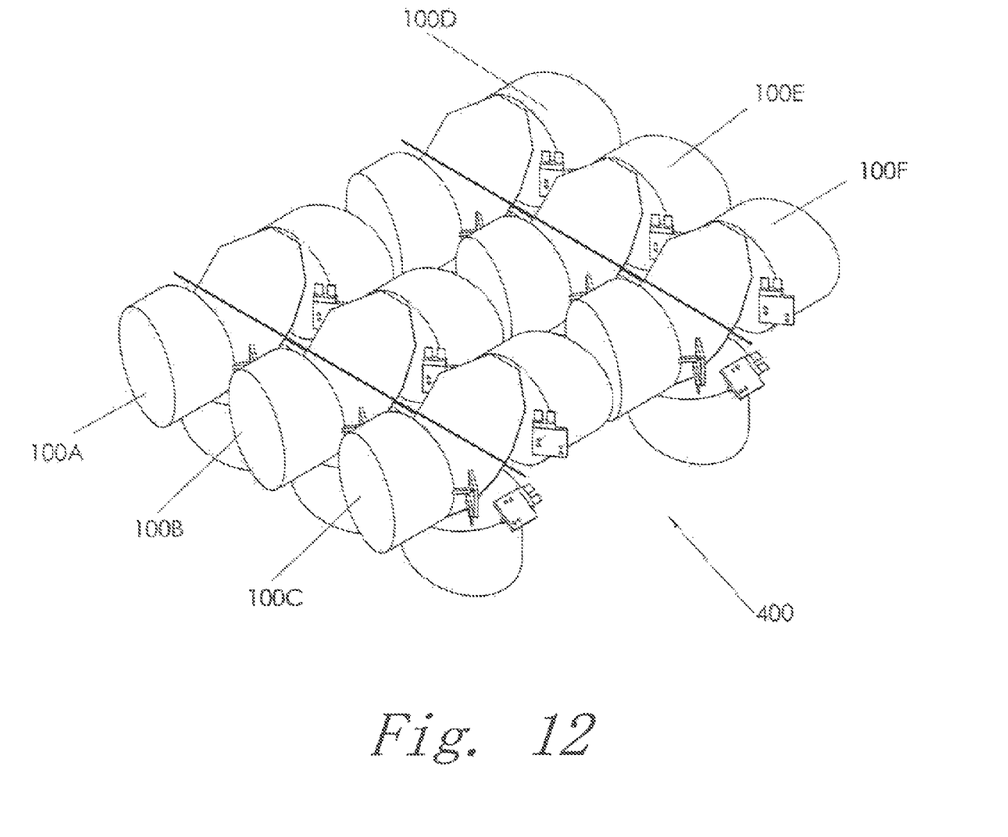
FIG. 12 is an isometric view showing an example of another color-configurable lighting array.

FIG. 12 shows another example of a color-configurable lighting array 400 having six color-configurable lighting assemblies 100A through 100F. Color-configurable lighting assemblies 100A-100F are substantially identical to one another. The respective solid-state light emitters of the color-configurable lighting assemblies are typically energized in a way that causes all of the color-configurable lighting assemblies to generate light of the same color. An armature (not shown) mounts color-configurable lighting assemblies 100A-100F with the fourth sides 117 of their squares 109 (FIG. 2) coplanar with one another. Such a color-configurable lighting array generates light of a high intensity suitable for illuminating large buildings or structures and the like.

I claim:

1. A color-configurable lighting assembly, comprising:
a first collimated light source, a second collimated light source and a third collimated light source, each collimated light source comprising:
a solid reflector optic, comprising:
a light output surface at a proximal end thereof;
a converging reflective surface at a distal end thereof; and
a light input facet at an edge of the light output surface; and
in optical contact with the light input facet, a solid-state light emitter to generate light, the solid-state light emitters of the first, second and third collimated light sources to generate light at a first wavelength, a second wavelength, and third wavelength, respectively,
the first, second and third collimated light sources arranged in order with their respective light outputs disposed parallel to a first side, a second side and a third side, respectively, of a square; and
a decussate optical filter located in the square to output light from the first, second and third collimated light sources through a fourth side of the square, the optical filter comprising:
disposed along a first diagonal of the square and facing the first side and the fourth side of the square, two coplanar first reflective filters reflective at the first wavelength and transmissive at the second and third wavelengths, and
disposed along a second diagonal of the square and facing the third side and the fourth side of the square, two coplanar second reflective filters reflective at the third wavelength and transmissive at the first and second wavelengths.

2. The color-configurable lighting assembly of claim 1, in which, in each collimated light source:
the collimated light source additionally comprises an elongate light guide comprising a light input surface and a light output surface opposite the light input surface; and
the solid-state light emitter is in optical contact with the light input surface and the light output surface is in optical contact with the light input facet to provide the optical contact between the solid-state light emitter and the light input facet.

3. The color-configurable lighting assembly of claim 1, in which:
the second wavelength is longer than the first wavelength, and the third wavelength is longer than the second wavelength;
the first reflective filters have a low-pass filter characteristic; and
the second reflective filters have a high-pass filter characteristic.

4. The color-configurable lighting assembly of claim 1, in which:
the second wavelength is shorter than the first wavelength, and the third wavelength is shorter than the second wavelength;
the first reflective filters have a high-pass filter characteristic; and
the second reflective filters have a low-pass filter characteristic.

5. The color-configurable lighting assembly of claim 1, in which:
the square is a first square;
the decussate optical filter is a first decussate optical;
the light source additionally comprises:
a fourth collimated light source and a fifth collimated light source, each comprising:
a solid reflector optic, comprising:
a light output surface at a first end thereof;
a converging reflective surface at a second end thereof; and
a light input facet at a periphery of the light output surface; and
in optical contact with the light input facet, a solid-state light emitter to generate light, the solid-state light emitters of the fourth and fifth collimated light sources to generate light at a fourth wavelength and a fifth wavelength, respectively,
the fourth and fifth collimated light sources arranged in order with their respective light outputs disposed parallel to a first side and a third side, respectively, of the second square, the second square having a second side between the first side and the second side and adjacent the fourth side of the first square; and
a second decussate optical filter located in the second square to output light from the first through fifth collimated light sources through a fourth side of the second square, the optical filter comprising:
disposed along a first diagonal of the second square and facing the first side and the fourth side of the second square, two coplanar third reflective filters reflective at the fourth wavelength and transmissive at the first, second, third and fifth wavelengths, and
disposed along a second diagonal of the second square and facing the third side and the fourth side of the second square, two coplanar fourth reflective filters reflective at the fifth wavelength and transmissive at the first, second, third and fourth wavelengths.

6. The color-configurable lighting assembly of claim 5, in which, in each collimated light source:
the collimated light source additionally comprises an elongate light guide comprising a light input surface and a light output surface opposite the light input surface; and
the solid-state light emitter is in optical contact with the light input surface and the light output surface is in optical contact with the light input facet to provide the optical contact between the solid-state light emitter and the light input facet.

7. The color-configurable lighting assembly of claim 5, in which:
the second wavelength is longer than the first wavelength, and the third wavelength is longer than the second wavelength;
the first reflective filters have a low-pass filter characteristic; and
the second reflective filters have a high-pass filter characteristic.

8. The color-configurable lighting assembly of claim 5, in which:
the second wavelength is shorter than the first wavelength, and the third wavelength is shorter than the second wavelength;
the first reflective filters have a high-pass filter characteristic; and
the second reflective filters have a low-pass filter characteristic.

9. A color-configurable lighting array, comprising:
a first color-configurable lighting assembly in accordance with claim 1,
a second color-configurable lighting assembly in accordance with claim 1;
a third color-configurable lighting assembly in accordance with claim 1; in which the fourth sides of the squares of the first, second and third color-configurable lighting assemblies are arranged parallel to a first side, a second side and a third side, respectively, of an additional square; and
an additional decussate optical filter located in the additional square to output light from the first, second and third color-configurable lighting assemblies through a fourth side of the additional square, the additional optical filter comprising:
disposed along a first diagonal of the additional square and facing the first side and the fourth side of the additional square, two coplanar reflective filters reflective at the wavelengths of the light output by the first color-configurable lighting assembly and transmissive at the wavelengths of the light output by the second and third color-configurable lighting assemblies, and
disposed along a second diagonal of the additional square and facing the third side and the fourth side of the additional square, two coplanar reflective filters reflective at the wavelengths of the light output by the third color-configurable lighting assembly and transmissive at the wavelengths of the light output by the first and second color-configurable lighting assemblies.

10. The color-configurable lighting array of claim 9, in which, in each collimated light source:
the collimated light source additionally comprises an elongate light guide comprising a light input surface and a light output surface opposite the light input surface; and
the solid-state light emitter is in optical contact with the light input surface and the light output surface is in optical contact with the light input facet to provide the optical contact between the solid-state light emitter and the light input facet.

11. The color-configurable lighting array of claim 9, in which:
the light sources of the second color-configurable lighting assembly generate light longer in wavelength than the light generated by the light sources of the first color-configurable lighting assembly; and
the light sources of the third color-configurable lighting assembly generate light longer in wavelength than the light generated by the light sources of the second color-configurable lighting assembly.

12. The color-configurable lighting array of claim 9, in which:
the light sources of the second color-configurable lighting assembly generate light shorter in wavelength than the light generated by the light sources of the first color-configurable lighting assembly; and
the light sources of the third color-configurable lighting assembly generate light shorter in wavelength than the light generated by the light sources of the second color-configurable lighting assembly.

13. A color configurable lighting array, comprising an M by N array of similar color-configurable lighting assemblies in accordance with claim 1, where M and N are integers, arranged with the fourth sides of their respective square coplanar.

14. The color-configurable lighting array of claim 13, in which, in each collimated light source:
the collimated light source additionally comprises an elongate light guide comprising a light input surface and a light output surface opposite the light input surface; and
the solid-state light emitter is in optical contact with the light input surface and the light output surface is in optical contact with the light input facet to provide the optical contact between the solid-state light emitter and the light input facet.

* * * * *